United States Patent [19]

Epstein

[11] Patent Number: 5,036,996
[45] Date of Patent: Aug. 6, 1991

[54] SAFETY SEAL FOR PRESSURIZED SYSTEM

[76] Inventor: Harry Epstein, 687 Kildare Crescent, Seaford, N.Y. 11783

[21] Appl. No.: 531,116

[22] Filed: May 31, 1990

[51] Int. Cl.⁵ .......................................... B65D 45/00
[52] U.S. Cl. ................................. 220/316; 220/582; 220/240; 220/304; 215/270; 215/330
[58] Field of Search ............... 220/316, 240, 304, 3, 220/239; 215/270, 330

[56] References Cited

U.S. PATENT DOCUMENTS

| 2,938,647 | 5/1960 | Cornelius | 220/316 |
| 4,267,940 | 5/1981 | Wade | 220/321 |
| 4,515,287 | 5/1985 | Baudoux et al. | 220/316 |
| 4,589,566 | 5/1986 | Rives et al. | 220/316 |
| 4,700,866 | 10/1987 | Taylor | 220/316 |
| 4,936,483 | 6/1990 | Ballu | 220/240 |

Primary Examiner—Stephen Marcus
Assistant Examiner—Stephen K. Cronin
Attorney, Agent, or Firm—Lackenbach Siegel Marzullo & Aronson

[57] ABSTRACT

A safety seal for a pressurized system, such as a pressurized oil sprayer used in lubricating engines, or a pressurized paint sprayer, wherein the closure, for an inlet member, for addition of material such as oil or paint, is prevented from being removed, when the system is in the pressurized state. A resilient band, inaccessible from the exterior of the system, is tightly compressed by internal pressurization against an interface between the closure and inlet member thereby locking the closure into a non-removable position. Reduction of internal pressure permits the resilient band to contract away from the interface, thereby unlocking the closure from its non-removable position, with the closure being removable thereafter for addition of material into the inlet.

9 Claims, 1 Drawing Sheet

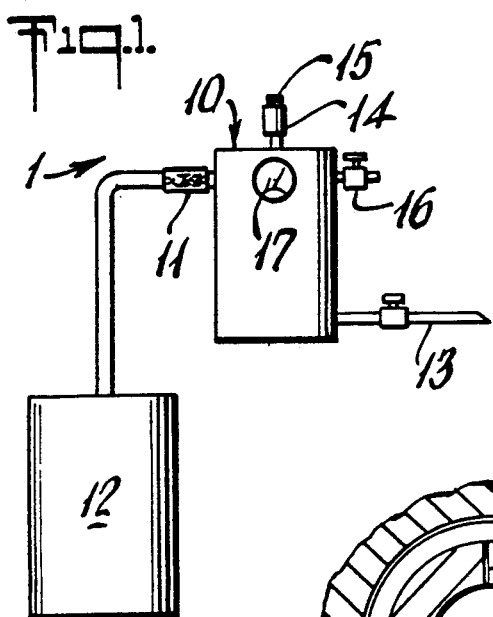
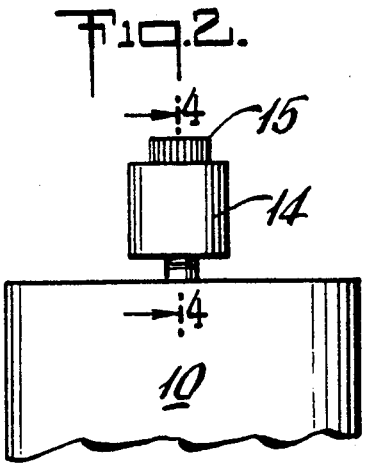
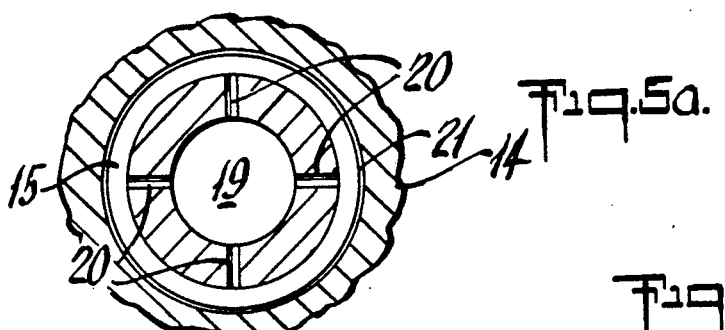
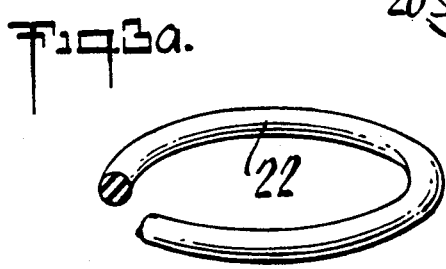
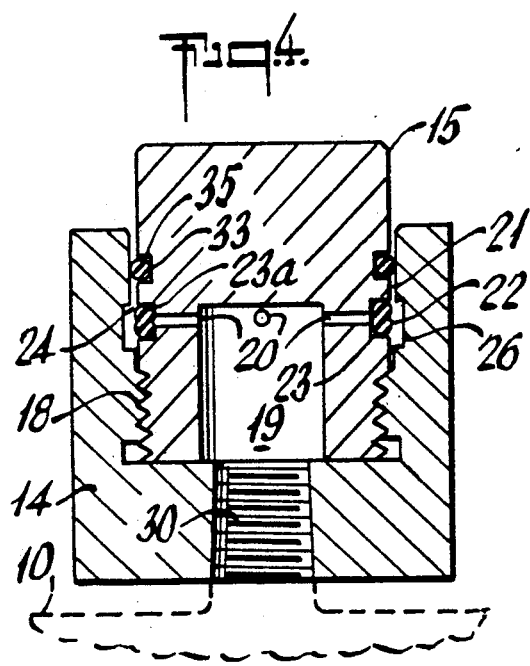
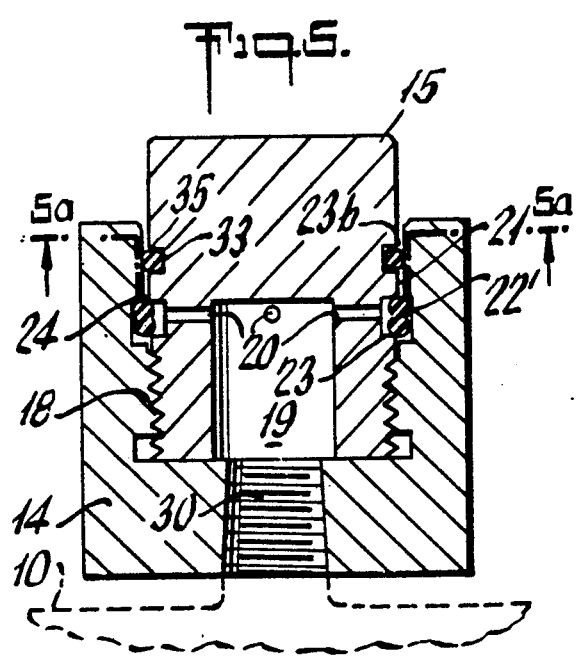

SAFETY SEAL FOR PRESSURIZED SYSTEM

This invention relates to safety devices and safety measures for pressurized systems used in the dispensing of pressurized contents, particularly to systems having inlets for the continued addition of material when the system is not in the pressurized state, and most particularly to safety measures for preventing hazardous removal of inlet closures when the system is in the pressurized state.

Access inlets for addition of materials to pressurized dispensers such as pressurized oil and paint dispensers, require safety measures to ensure that closures for the access inlets are not removed when the system is in the pressurized state. Without such measures, the closures and the contained pressurized materials can become dangerous projectiles. Generally these safety measures are unrelated to the actual pressurized state of the system and are usually external physical devices such as redundant latches or specifically oriented closure position latching and unlatching which require a conscious effort for disengagement. In addition, there is usually some sort of indication, such as a gauge, which informs the user of the degree of pressurization of the system contents. These measures do not however provide a fail-safe impediment to a careless removal without a proper ascertainment of the pressurized state of the contents. In addition, a malfunction of the gauge, e.g. a sticking indicator needle can have dangerous unintended consequences.

It is accordingly an object of the present invention to provide safety means, for actually preventing removal of a material inlet closure from a pressurized system, which safety means is dependent only upon the pressurized state of the system for operation.

It is a further object of the present invention to provide such safety means whereby it is not externally accessible and cannot be accidentally or even intentionally overridden except by depressurization of the system.

These and other objects, features and advantages of the present invention will become more evident from the following discussion as well as the drawings in which:

FIG. 1 is an elevation view of a pressurized dispensing device having an inlet for addition of materials;

FIG. 2 is an enlarged view of the material inlet and the external closure therefor;

FIG. 3a is an isometric view of a suitable safety means for the present invention in the form of a resilient band having a circular cross-section (as shown by the cutaway);

FIG. 3b is an isometric view of a preferred embodiment of a safety means for the present invention in the form of a resilient band having a double, joined ring "figure-8" cross-section (as shown by the cutaway);

FIG. 4 is a cross section taken along line 4—4 of FIG. 2, showing the engagement between the inlet and the closure member therefor, in an unpressurized state and the resilient band of FIG. 3a in the unlocked position; and FIG. 5 is the cross section view of FIG. 4 with the system in a pressurized state and the resilient band of FIG. 3a in the locked position.

FIG. 5a is a cross-section taken along the line 5a—5a of FIG. 5.

A method of dispensing materials, particularly in the liquid state, involves a device having an inlet for the introduction of pressurized gas, usually air, into a container-like member having the material to be dispensed contained therewithin. A valved outlet provides for the continued controlled dispensing of the liquid material for the desired purpose such as spray painting or the oil-lubrication of reconstructed engines which have been drained of oil. With the continued dispensing of material there is also an inlet for addition of more material to replenish that which has been dispensed.

In order to permit further introduction of material into the container through the material inlet, the pressurized dispensing device further embodies means for permitting depressurization such as with a separate bleeder valve in conjunction with cutting off introduction of additional pressurized gas. The bleeder valve and an internal-pressure gauge can be integrated or can be separately removable and threadingly seated on a single outlet. When the device is substantially depressurized, a closure, such as a threaded screw cap, for the material inlet, is removed and material is then safely added. Failure to depressurize the system prior to removal of the closure can result in a hazardous condition.

The present invention generally comprises safety means for a pressurized material dispensing system having an inlet member for addition of dispensable material, when the system is in a depressurized state, with the removal or opening, i.e. general unseating, of a closure member sealingly fitted on or within the inlet member. In accordance with the present invention, pressure dependent means, exposed to the interior pressure of the pressurized system, prevent unseating of the material inlet closure member when the system is in a state of pressurization above a pre-determined level. Depressurization of the system to the pre-determined level deactivates the pressure dependent means, thereby allowing the closure member to be unseated for the introduction of additional dispensable material. The pressure dependent means for prevention of closure member unseating, is inaccessible from the exterior of the system and cannot be accidentally or even deliberately deactivated when the system is in the pressurized state.

In a preferred embodiment, the closure member is sealingly seated on the inlet member with a rotary engagement such as a screw thread or a bayonet mount which provides axial resistance to internal pressurization but normally insufficient resistance to rotary disengagement. The closure member can be seated in several ways: as a cover for the end of the inlet member with the closure member having internal threads; as a plug within the end of the inlet member with the closure member having external threads; or as a combination structure of the two. The pressure dependent closure removal prevention means comprises a resilient element which is positioned adjacent an interface between the closure and inlet members and in the path of a pressure outlet between the closure and inlet members. Under internal pressurization, above a predetermined level, the resilient element is strongly urged, by a pressure differential, against surfaces of both the inlet and closure members across an interface therebetween. With such pressurized urging, the resilient element seals the pressure outlet, preventing unwanted depressurization of the system, and simultaneously locks the inlet and closure members into a fixed relative position by a combination of compressive and frictional forces supported by the pressure. In addition, with the spanning of the inlet and closure member interface by the resilient member, it may further act as a physical stop to separation of the inlet and closure members. Rotary disengagement is substantially impeded and the closure member cannot be removed in a normal manner. Depressurization below the pre-determined level allows the resilient element to relax and assume its original position away from the interface between closure and inlet members whereby the closure member can be freely removed for introduction of material (the need for which may be indicated by an optional dipstick integrated with the closure member) into the inlet member.

The resilient element must have sufficient structural integrity to be able to resist rotational forces and to withstand internal pressure without degradation. Furthermore, if the resilient element functions as a stop for closure removal, space should be provided, such as by recessing portions of both the closure and inlet members, whereby the resilient element can be retained out of the way for depressurized system closure removal and in the path of such removal during pressurization. In such embodiment, the resilient element should also have structural integrity to resist axial disengaging movement between inlet and closure members.

For maximum effectiveness, the pressure supported engagement between the resilient element and both the closure and inlet members should be a highly frictional one. To effect such frictional engagement, the surfaces of the closure and inlet members, which are in contact with the resilient member, should preferably be roughened. If possible, increasing the surface interface between the resilient member and both the inlet and closure members is desirable and can be effected by modifying the shape of the resilient member. In addition, the resilient member should not have a slippery or smooth surface which would degrade any frictional engagement and locking.

It is preferred for uniformity in operation and ease in deployment and maintaining of position that the resilient element be in the form of a band whereby it can be snapped into a retaining groove or cutout. In such embodiment the innermost of the inlet and closure members is provided with the retaining groove and the band is normally substantially completely seated therein. Examples of preferred cross-sections of the band include circular and integral double circles (figure '8') configurations, the latter providing a greater surface contact area.

Suitable materials include neoprene, and other natural or synthetic rubber materials having a chemical resistance to the contained materials and resistance to structural degradation upon repeated flexing.

With specific reference to the drawings, FIG. 1 depicts a typical pressurized dispensing device 1 having a material container 10 with a valved pressure inlet 11 for introduction of a pressurized gas such as air from compressor 12. For dispensing of the contained material, such as oil or paint, material container has a dispensing outlet 13. Though not shown, the pressure inlet is of a one way configuration whereby removal of the pressure source does not result in contents expulsion through the inlet valve. In addition, the dispensing outlet is provided with valving means for control of the dispensing rate or for complete shut-off.

Since the device dispenses material, depletion requires replenishment of the dispensed material through material inlet 14. Replenishment is effected by simple removal of inlet closure 15 and dumping of additional material into material inlet 14. However, such procedure requires that the system be depressurized prior to removal of closure 15 or sealing member. Accordingly, pressure bleeder valve 16 is used to slowly depressurize the system with gauge 17 showing the internal state of pressurization (if desired, the gauge and bleeder valve can be integrated or separately placeable on the same outlet).

As seen in FIG. 2, closure 15 is internally threaded in the mouth of inlet 14 and protrudes above the inlet for a sufficient distance to provide for manual removal of the closure when required.

The cross section view in FIG. 4 shows the inlet closure 15 engaged with the inlet 14 by means of a threaded engagement 18. The closure 15 embodies a central hollow 19, which extends above the screw thread engagement 30 (away from the pressurized interior of container 10), where pressure outlet vents 20 are located. These outlet vents lead to an annular passage or interface 21 between the closure 15 and the inlet 14 which in turn leads to the exterior of the system and to which contained pressurized gas can escape. Resilient band 22 (shown in more detail in FIG. 3a) is positioned in the pressure path between the outlet vents 20 and interface 21 and is fittingly snapped into circumferential groove 23 on the exterior surface of closure 15, above threaded engagement 18. When the system is in the non-pressurized state, resilient band 22 is in its relaxed state along the base 23a of groove 23 and adjacent the outer end of pressure outlet vents 20 (though two vents are shown, additional vents are provided around the periphery of the closure for uniformity of operation). The outer surface of the band 22 is sufficiently recessed (i.e. substantially completely contained) within groove 23 to provide little or no impediment with surface 24, of the inlet, for the removal or seating of the closure 15. A conventional, static O-ring seal is shown at 33 in peripheral groove 35.

As shown in FIG. 5, wherein the system is in the pressurized state, internal gas pressure passing through the outlet vents 20 pushes the resilient band 22 into circumferential engagement with both the closure 15 and the adjacent interior wall of the inlet 14. The resilient band 22 thereby seals off the interface 21 from the pressurized interior of the system preventing depressurization. In addition, the resilient band 22 is pressure compressed against surfaces 23b and 24 of both the closure and inlet respectively. The continued pressure compression against such surfaces provides a strong resistance to rotary disengagement between the closure and inlet. Furthermore, the inlet 14 has an adjacent circumferential shallow recess 26 of sufficient depth to permit only part of the cross section of resilient band 22 to be seated therebetween. Accordingly, resilient band 22 spans the interface 21 between closure and inlet whereby it further resists axial movement of the closure for removal thereof.

When the interior of the system is substantially depressurized to a safe pressure differential between, interior and exterior, such as below about 20 psi, the resilience of band 22 overcomes any residual pressure and it relaxes to its original position away from interface 21, as shown in FIG. 4, and the closure can be readily and safely removed. The modified band 22' shown in FIG. 3b, with its elongated double circle (FIG. 8) surface, provides a greater frictional interface and greater resistance to removal, and can be directly substituted for band 22, if desired.

The "O"-ring 33 in groove 35 in closure 15 functions to seal container 10 when closure 15 is in place and the container 10 is pressurized.

It is understood that the above described embodiment is illustrative of the present invention and details contained therein are not to be construed as limitations on the present invention. Changes in arrangement, configuration, materials and other structural features may be made without departing from the scope of the present invention as defined in the following claims.

What is claimed is:

1. Safety means for a pressurized material dispensing system, having an inlet member for addition of dispensable material to the dispensing system, and a closure member sealingly seated on the inlet member, characterized in that pressure dependent means, exposed to interior pressure of the pressurized system and inaccessible from outside the pressurized system when the closure member is seated on the inlet member, prevents unseating of the closure member from the inlet member, when the system is in a state of pressurization above a pre-determined level; and wherein depressurization of the system to the pre-determined level deactivates the pressure dependent means whereby the closure member may be unseated from the inlet member for the introduction of additional dispensable material, wherein (i) the closure member is seated on the inlet member with a rotary engagement and with an interface being formed therebetween, and wherein the pressure dependent means comprises a resilient element positioned adjacent the interface between the closure and inlet members and in the path of a pressure outlet to the exterior of the system; whereby under internal pressurization, above the pre-determined level, the resilient element is urged, by a pressure differential between the interior and exterior of the system, against surfaces of both the inlet and closure members across the interface therebetween, whereby the resilient element seals the pressure outlet, preventing unwanted depressurization of the system, and simultaneously locks the inlet and closure members into a substantially fixed relative position; and wherein de-pressurization below the pre-determined level causes the resilient element to relax away from locking the inlet and closure members whereby the closure member can be unseated;

(ii) the resilient element locks the inlet and closure members into the substantially fixed relative position by a combination of compressive and frictional forces supported by the interior pressure of the system above the pre-determined level;

(iii) the closure member is unseated from the inlet member in an axial movement direction relative to the rotary engagement, and wherein the resilient element moves to a position whereby it impedes the axial movement, at internal pressurization above the pre-determined level;

(iv) at least one of the surfaces of the closure and inlet members, against which the resilient member is urged, is roughened to enhance the frictional forces;

(v) the closure member comprises a plug having external threads adapted to be threadingly engaged with internal threads of the inlet member for the sealing seating and rotary engagement and wherein the closure member has a central hollow therein, characterized in that the central hollow extends beyond the area of threaded engagement between the threads of the inlet and closure members, relative to the interior of the pressurized system, with walls of the extended portion of the central hollow being apertured with a plurality of pressure outlet vents extending therethrough; the closure member further having a circumferential groove on its exterior wall, with the circumferential groove being aligned with the outer ends of the pressure outlet vents; wherein the resilient element comprises a resilient band adapted to be seated and substantially completely retained within the circumferential groove, whereby under the internal pressurization above a pre-determined level, the resilient band is urged out of the circumferential groove into frictional engagement against surfaces of the inlet and closure members to provide the locking in the substantially fixed relative position.

2. The safety means of claim 1 wherein the inlet member comprises a circumferential recess, on the interior surface thereof, which is in adjacent alignment with the circumferential groove on the closure member, when the closure member is fully seated on the inlet member, and wherein the recess can retain only a portion of the resilient bend therein.

3. The safety means of claim 2 wherein the resilient band has a circular cross-section.

4. The safety means of claim 2 wherein the resilient band has a figure 8 cross-section.

5. The safety means of claim 2 wherein the dispensable material is lubricating oil.

6. A safety seal device comprising (i) a housing having an opening, a threaded interior passageway communicating with said opening, an annular peripheral groove adjacent and coaxial with the threaded passageway and an outlet passage communicating with said passageway and spaced from said opening;

(ii) a sealing member having an external threaded portion adapted to threadably engage the interior passageway of said housing, an open chamber adapted to communicate with the outlet passage of the housing, a first annular peripheral groove adjacent and coaxial with the external threaded portion adapted to be positioned adjacent the annular peripheral groove of said housing, a plurality of passageways extending from said chamber to the annular peripheral groove of the sealing member and a cap portion adjacent the annular peripheral groove of the sealing member adapted to at least partly, closely fit into the opening in said housing to establish an annular passage between the housing and the cap of the sealing member which communicates with the aforesaid peripheral grooves when they are in alignment, a second annular peripheral groove arranged in said cap member and containing a first annular resilient ring which is adapted to control said housing and seal said annular passage between the housing and the cap;

(iii) an annular resilient ring which fits snugly into the annular peripheral groove of the sealing member when the chamber in the groove is not pressurized and which expands radially outward into the annular peripheral groove of said housing and frictionally engage the housing to resist movement thereof.

7. The safety seal device in accordance with claim 6, wherein said resilient annular ring comprises two joined rings each of which is circular in cross-section.

8. The safety seal device in accordance with claim 6, wherein said housing opening and passageway, the open chamber of the sealing member, and the outlet passage of the housing are all cylindrical in shape and in axial alignment.

9. The safety seal device in accordance with claim 6, wherein the plurality of passageways extend symmetrically and radially from said chamber to said annular peripheral groove of said sealing member.

* * * * *